United States Patent
Yu et al.

(10) Patent No.: US 10,021,718 B2
(45) Date of Patent: Jul. 10, 2018

(54) METHOD AND DEVICE FOR SENDING OR ACQUIRING GRANT SIGNALING

(71) Applicant: ZTE Corporation, Shenzhen (CN)

(72) Inventors: Bin Yu, Shenzhen (CN); Bo Dai, Shenzhen (CN); Shuqiang Xia, Shenzhen (CN); Zhirong Lin, Shenzhen (CN); Junfeng Zhang, Shenzhen (CN); Dan Zheng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 34 days.

(21) Appl. No.: 14/785,065

(22) PCT Filed: Dec. 31, 2013

(86) PCT No.: PCT/CN2013/091099
§ 371 (c)(1),
(2) Date: Oct. 16, 2015

(87) PCT Pub. No.: WO2014/169694
PCT Pub. Date: Oct. 23, 2014

(65) Prior Publication Data
US 2016/0088651 A1    Mar. 24, 2016

(30) Foreign Application Priority Data

Apr. 18, 2013    (CN) .......................... 2013 1 0135921

(51) Int. Cl.
*H04Q 7/20*    (2006.01)
*H04W 72/14*    (2009.01)
(Continued)

(52) U.S. Cl.
CPC ............... *H04W 72/14* (2013.01); *H04L 5/00* (2013.01); *H04W 72/042* (2013.01); *H04W 72/121* (2013.01)

(58) Field of Classification Search
None
See application file for complete search history.

(56) References Cited

U.S. PATENT DOCUMENTS

| 2008/0031191 A1* | 2/2008 | Kashima | H04B 7/0452 |
| | | | 370/329 |
| 2010/0054188 A1* | 3/2010 | Matsumoto | H04L 1/1671 |
| | | | 370/328 |

(Continued)

FOREIGN PATENT DOCUMENTS

| CN | 101982001 A | 2/2011 |
| WO | 20130171154 A1 | 2/2013 |

OTHER PUBLICATIONS

International Search Report for corresponding application PCT/CN2013/091099 filed Dec. 31, 2013; dated Apr. 3, 2014.

*Primary Examiner* — Edan Orgad
*Assistant Examiner* — Sithu Ko
(74) *Attorney, Agent, or Firm* — Cantor Colburn LLP

(57) ABSTRACT

Provided are a method and device for sending or acquiring a grant signalling. The method for sending a grant signalling includes: configuring one Multi-Physical Downlink Control Channel (M-PDCCH); and sending a grant signalling to N pieces of User Equipment (UE) through the M-PDCCH. By the technical solution, the technical problem that data throughput and spectral efficiency of a system are reduced by higher PDCCH overhead caused by the fact that one PDCCH or EPDCCH signalling can be granted to only one piece of UE in the related technology is solved, and the (Continued)

technical effect of improving the data throughput and spectral efficiency of the system is achieved.

24 Claims, 6 Drawing Sheets

(51) Int. Cl.
*H04W 72/04* (2009.01)
*H04L 5/00* (2006.01)
*H04W 72/12* (2009.01)

(56) References Cited

U.S. PATENT DOCUMENTS

| | | | |
|---|---|---|---|
| 2011/0222485 A1* | 9/2011 | Nangia | H04B 7/0452 370/329 |
| 2013/0015953 A1* | 1/2013 | Hsu | H04W 4/005 340/7.46 |
| 2013/0150109 A1* | 6/2013 | Takano | H04L 5/001 455/509 |

* cited by examiner

METHOD AND DEVICE FOR SENDING OR ACQUIRING GRANT SIGNALING

TECHNICAL FIELD

The present disclosure relates to the field of communication, and in particular to a method and device for sending or acquiring a grant signalling.

BACKGROUND

In a Long Term Evolution (LTE) wireless system corresponding to an Evolved Universal Terrestrial Radio Access (E-UTRA) protocol formulated by the 3rd Generation Partnership Project (3GPP), a base station (referred to as an Evolved Node B, eNodeB, in the LTE system) on a network side may dynamically send, through a Physical Downlink Control Channel (PDCCH) or Enhanced Physical Downlink Control Channel (EPDCCH) or high-layer configuration signalling (for example, Radio Resource Control (RRC) signalling or Medium Access Control (MAC) signalling), or pre-configure a DownLink (DL) grant and an UpLink (UL) grant to User Equipment (UE) for the UE to acquire a resource of its Physical Downlink Shared Channel (PDSCH) or Physical Uplink Shared Channel (PUSCH). The UE receives the PDSCH or sends the PUSCH on the corresponding resource in a manner indicated by grant signalling according to the obtained DL grant or UL grant (or the preconfigured DL grant and UL grant).

The PDCCH and the EPDCCH are used for bearing Downlink Control Information (DCI). LTE initially adopts the PDCCH; however, because there exists stronger interference between different types of eNodeBs in a heterogeneous network, e.g., interference of a macro eNodeB to a pico eNodeB, and interference of a home eNodeB to a macro eNodeB, a UE-specific pilot-based multi-antenna transmission method for solving the abovementioned interference problem is put forward in a subsequent version of LTE. In addition, a PDCCH is mapped to a PDSCH area, and a frequency division multiplexing manner similar to that used in PDSCH multiplexing may be adopted to realize frequency-domain coordination of inter-cell interference. Such an enhanced PDCCH is called an EPDCCH.

Briefly, a Control Channel Element (CCE) is taken as a unit for a physical resource transmitted by a PDCCH, wherein the size of each CCE is 9 Resource Element Groups (REG), i.e. 36 resource elements, and each PDCCH occupies 1, 2, 4 or 8 CCEs. For the four kinds of PDCCHs respectively occupying 1, 2, 4 and 8 CCEs, aggregation in a tree structure is adopted, that is, the PDCCH occupying 1 CCE may be started from a location of any CCE, the PDCCH occupying 2 CCEs is started from a location of an even CCE, the PDCCH occupying 4 CCEs is started from a location of a CCE of which the sequence number is an integral multiple of 4, and the PDCCH occupying 8 CCEs is started from a location of a CCE of which the sequence number is an integral multiple of 8. Each aggregation level L, where L∈{1, 2, 4, 8}, corresponds to one search space, wherein there are two types of search spaces, i.e., a Common Search Space (CSS) and a UE-Specific Search Space (USS).

In the kth subframe, a control domain bearing a PDCCH consists of a group of CCEs, specifically, $N_{CCE,k}$ CCEs numbered from 0 to $N_{CCE,k}-1$. UE needs to detect, in each non-Discontinuous Reception (non-DRX) subframe, a group of PDCCH candidates to acquire control information, the detection referring to decoding the PDCCHs in the group according to all DCI formats to be detected. A search space $S_k^{(L)}$ of an aggregation level L∈{1, 2, 4, 8} on subframe k is defined by a group of PDCCH candidates, and a CCE corresponding to PDCCH candidate m in the search space $S_k^{(L)}$ may be defined by a formula as follows:

$$L \cdot \{(Y_k+m) \bmod \lfloor N_{CCE,k}/L \rfloor\}+i$$

where i=0, . . . , L-1, $Y_k$ is an initial candidate location of a USS, $N_{CCE,k}$ is the number of CCEs for bearing the PDCCH in the kth subframe, m=0, . . . , $M^{(L)}-1$, $M^{(L)}$ is the number of the PDCCH candidates to be detected in the search space $S_k^{(L)}$, and the search space consists of continuous CCEs; for a CSS, $Y_k=0$, and L is valued to be 4 or 8; and for the USS, L is valued to be 1, 2, 4 or 8, $Y_k=(A \cdot Y_{k-1}) \bmod D$, where $Y_{-1}=n_{RNTI} \neq 0$, A=39827 D=65537 k=$\lfloor n_s/2 \rfloor$, where $\lfloor\ \rfloor$ represents rounding down, $n_s$ represents a timeslot number in a radio frame, $n_{RNTI}$ represents a corresponding Radio Network Temporary Identifier (RNTI).

The newly considered EPDCCH in LTE continues to use a framework design of a PDCCH as much as possible, concepts of an EPDCCH Enhanced CCE (eCCE) and the eCCE aggregation as well as a design of a search manner of an EPDCCH in an eCCE-set-based search space all continue to use the manners adopted for the PDCCH, and the only difference lies in the specific aggregation levels, the division of eCCEs and the change of resource locations of the EPDCCH to a new resource area.

The PDCCH or EPDCCH in LTE is distinguished by different types of DCI formats, and each DCI format and each information field in the DCI formats in LTE are defined in 3GPP TS 36.212, wherein DCI format 0 and DCI format 4 are used for UL grant; and DCI format 1, DCI format 1A, format 1B, format 1C, format 1D, format 2, format 2A, format 2B, format 2C and format 2D are used for DL grant. Each DCI format contains a 16-bit Cyclic Redundancy Check (CRC), and each CRC may correspond to an RNTI in an implicit coding manner, that is, the CRC is scrambled by the RNTI. The UE then performs blind detection on the PDCCH or the EPDCCH according to the RNTI to acquire its control information. RNTIs defined in LTE include Cell Radio Network Temporary Identifiers (C-RNTI), Semi-Persistent Scheduling Radio Network Temporary Identifiers (SPS-RNTI), Random Access Radio Network Temporary Identifiers (RA-RNTI), Paging Radio Network Temporary Identifiers (P-RNTI) and Temporary Cell Radio Network Temporary Identifiers (TC-RNTI), wherein the C-RNTI and SPS-RNTI are UE-specific, can distinguish UE and are identifiers allocated to the UE by a network.

The control signalling format for bearing a DL grant or a UL grant on a PDCCH or an EPDCCH in LTE is for single UE, that is, one PDCCH or EPDCCH signalling can be granted to only one piece of UE. Therefore, when there are many pieces of UE, overhead of the PDCCH is relatively high, and increase of the overhead will reduce data throughput of a system and namely reduce spectral efficiency. Under the condition that the overhead of the PDCCH is fixed, the number of the UE that can be scheduled at a certain moment is limited, then scheduling of a part of UE needs to be delayed, and the resource at the moment may also not be fully used, thereby causing influence on the throughput or user perception.

For the problem, there is yet no effective solution.

SUMMARY

The embodiments of the present disclosure provide a method and device for sending or acquiring a grant signalling, so as to solve at least one of the technical problems that data throughput and spectral efficiency of a system are reduced by higher PDCCH overhead caused by the fact that one PDCCH or EPDCCH signalling can be granted to only one piece of UE in a related art.

According to one aspect of the embodiments of the present disclosure, a method for sending a grant signalling is provided, which includes: configuring one Multi-Physical Downlink Control Channel (M-PDCCH); and sending a grant signalling to N pieces of UE through the M-PDCCH, wherein N is a positive integer more than 1.

In an example embodiment, a control information format of the M-PDCCH includes: a common information field and/or a UE-specific information field, wherein the common information field and/or the UE-specific information field contains the grant signalling.

In an example embodiment, there are one or more common information fields which are shared by the N pieces of UE.

In an example embodiment, the M-PDCCH includes: an M-PDCCH bearing an UL grant and/or an M-PDCCH bearing a DL grant.

In an example embodiment, under a condition that the M-PDCCH is the M-PDCCH bearing the UL grant, the common information field includes at least one of: a Modulation and Coding Scheme (MCS) and redundancy version information field, a resource allocation information field, a carrier indicator information field, a new data indicator information field, an UL Demodulation Reference Signal (DMRS) information field, a Channel State Information (CSI) request information field, a Sounding Reference Signal (SRS) request information field and a frequency hopping indicator information field; and/or under a condition that the M-PDCCH is the M-PDCCH bearing the DL grant, the common information field includes at least one of: an MCS information field, a Hybrid Automatic Repeat Request (HARQ) process number information field, a resource allocation information field, a carrier indicator information field, a new data indicator information field, a redundancy version information field and an SRS request information field.

In an example embodiment, configuring one M-PDCCH includes: sequencing the common information field and the UE-specific information field according to a predefined arrangement order of the common information field and the UE-specific information field in the control information format of the M-PDCCH; or sequencing the UE-specific information fields of various pieces of UE according to a predefined arrangement order of the UE-specific information fields of various pieces of UE in the N pieces of UE.

In an example embodiment, sequencing the UE-specific information field of each piece of UE according to the predefined arrangement order of the UE-specific information field of each piece of UE in the N pieces of UE includes: configuring one index to each piece of UE in the N pieces of UE, and sequencing the UE-specific information field of each piece of UE in the N pieces of UE according to indication of the index of each piece of UE; and/or sequencing the UE-specific information field of each piece of UE in the N pieces of UE according to N values obtained by a modulo operation taking N C-RNTIs of the N pieces of UE as dividends and N as divisors, wherein the N values obtained by the modulo operation taking the N C-RNTIs of the N pieces of UE corresponding to the same M-PDCCH as dividends and N as divisors are different from each other.

In an example embodiment, the method further includes: configuring one Multi-user RNTI (M-RNTI) to the N pieces of UE through a high-layer signalling, wherein the M-RNTI corresponds to the M-PDCCH.

In an example embodiment, under a condition that the common information field includes a resource allocation information field, the resource allocation information field is used for indicating one group of resources, wherein the one group of resources includes N parts of sub-resources, and the N parts of sub-resources are transmitted to the N pieces of UE according to a predefined resource indication rule, wherein one-to-one correspondence exists between the N parts of sub-resources and the N pieces of UE.

In an example embodiment, the predefined resource indication rule includes that: each piece of UE in the N pieces of UE corresponds to one index respectively, and one-to-one correspondence exists between indexes of the N pieces of UE and the N parts of sub-resources; and/or a modulo operation is performed taking N C-RNTIs of the N pieces of UE as dividends and N as divisors, and one-to-one correspondence exists between N values obtained by the modulo operation and the N parts of sub-resources, wherein the N values obtained by the modulo operation taking the N C-RNTIs of the N pieces of UE corresponding to the same M-PDCCH as dividends and N as divisors are different from each other.

In an example embodiment, the one-to-one correspondence between the N parts of sub-resources and the N pieces of UE in the predefined resource indication rule is changed along with a change in a subframe index.

In an example embodiment, the one group of resources are continuous resources, or the one group of resources include N clusters of resources, wherein resources of each cluster in the N clusters of resources are continuous resources on a frequency band, and different clusters of resources are discontinuous.

In an example embodiment, the one group of resources are divided into the N parts of sub-resources in at least one of manners as follows: sequential division and extraction at preset intervals.

In an example embodiment, a resource exchange indicator indicates whether to reorganize the one-to-one correspondence between the N parts of sub-resources and the N pieces of UE or not.

In an example embodiment, under a condition that the common information field includes a resource allocation information field, the resource allocation information field indicates the same resource to the N pieces of UE, and the N pieces of UE perform data communication with an eNodeB on the same resource by virtue of a multi-user Multiple Input Multiple Output (MIMO) multi-antenna technology.

In an example embodiment, a correspondence between each piece of UE in the N pieces of UE and antenna ports is determined according to at least one piece of the following predefined information: signalling, C-RNTI, subframe index, and predefined value.

In an example embodiment, a payload of a control information format of the M-PDCCH is the same as a payload of a control information format for single-user grant.

In an example embodiment, the M-PDCCH includes at least one of: a single-Transmission Time Interval (TTI) grant M-PDCCH and a multi-TTI grant M-PDCCH.

In an example embodiment, a scheduling manner for the M-PDCCH is indicated by an RNTI and/or CRC for scrambling the M-PDCCH, wherein the scheduling manner includes at least one of: multi-user scheduling and single-user scheduling.

In an example embodiment, the sent grant signalling includes: a shared grant signalling.

In an example embodiment, the method further includes: sending a common grant signalling to the N pieces or UE and/or sending a UE-specific grant signalling to each of one or more pieces of UE in the N pieces of UE, wherein one or more of the shared grant signalling, the UE-specific grant signalling and the common grant signalling are sent to the N pieces of UE.

In an example embodiment, sending the shared grant signalling includes: sending, through the M-PDCCH, the shared grant signalling to the N pieces of UE in a search space shared by the N pieces of UE; sending the common grant signalling includes: sending the common grant signalling to the N pieces of the UE in a common search space; and sending the UE-specific grant signalling includes: sending the UE-specific grant signalling in one or more of the common search space, the search space shared by the N pieces of the UE and a UE-specific search space.

In an example embodiment, the value of N is notified to the N pieces of UE through an RRC signalling.

According to another aspect of the embodiments of the present disclosure, a method for acquiring a grant signalling is provided, which includes: detecting an M-PDCCH, wherein the M-PDCCH is used for sending a grant signalling to N pieces of UE, and N is a positive integer more than 1; and acquiring the grant signalling in the M-PDCCH.

In an example embodiment, acquiring the grant signalling in the M-PDCCH includes: acquiring the grant signalling according to a control information format of the M-PDCCH, wherein the control information format includes: a common information field and/or a UE-specific information field, wherein the common information field and/or the UE-specific information field contains the grant signalling.

In an example embodiment, under a condition that the common information field includes a resource allocation information field, a piece of UE determines, according to a predefined resource indication rule, one part of sub-resources corresponding to the UE itself in one group of resources indicated by the resource allocation information field, wherein the one group of resources includes N parts of sub-resources, wherein one-to-one correspondence exists between the N parts of sub-resources and the N pieces of UE.

In an example embodiment, the UE determining, according to the predefined resource indication rule, one part of sub-resources corresponding to the UE itself in the one group of resources indicated by the resource allocation information field includes: the UE determining one part of sub-resources corresponding to the UE itself according to an index corresponding to the UE; or the UE performing a modulo operation taking its own C-RNTI as a dividend and N as a divisor, and determining one part of sub-resources corresponding to the UE itself according to a correspondence between the value obtained by the modulo operation and its corresponding part of sub-resources.

In an example embodiment, the one group of resources are continuous resources, or the one group of resources include N clusters of resources, wherein resources of each cluster in the N clusters of resources are continuous resources on a frequency band, and different clusters of resources are discontinuous.

In an example embodiment, the one group of resources are divided into the N parts of sub-resources in at least one of manners as follows: sequential division and extraction at preset intervals.

In an example embodiment, after acquiring the grant signalling in the M-PDCCH, the method further includes: communicating with an eNodeB according to a manner indicated by the common information field and/or the UE-specific information field.

In an example embodiment, detecting the M-PDCCH includes: detecting the M-PDCCH according to an M-RNTI configured by an eNodeB.

In an example embodiment, the acquired grant signalling includes: a shared grant signalling.

In an example embodiment, the method further includes: acquiring a common grant signalling and/or a UE-specific grant signalling.

In an example embodiment, acquiring the shared grant signalling includes: detecting the M-PDCCH in a search space shared by the N pieces of UE to acquire the shared grant signalling; acquiring the common grant signalling includes: acquiring the common grant signalling in a common search space; and acquiring the UE-specific grant signalling in one of manners as follows: acquiring the UE-specific grant signalling in the common search space, or acquiring the UE-specific grant signalling in the common search space and a UE-specific search space, or acquiring the UE-specific grant signalling in the common search space, the search space shared by the N pieces of UE and the UE-specific search space.

In an example embodiment, the M-PDCCH is transmitted on a PDCCH and/or an EPDCCH, and each M-PDCCH corresponds to one control information format.

According to another aspect of the embodiments of the present disclosure, a device for sending a grant signalling is provided, which includes: a configuration unit, configured to configure an M-PDCCH; and a first sending unit, configured to send a grant signalling to N pieces of UE through the M-PDCCH, wherein N is a positive integer more than 1.

In an example embodiment, a control information format of the M-PDCCH includes: a common information field and/or a UE-specific information field, wherein the common information field and/or the UE-specific information field contains the grant signalling.

In an example embodiment, there are one or more common information fields which are shared by the N pieces of UE.

In an example embodiment, the M-PDCCH includes: an M-PDCCH bearing an UL grant and/or an M-PDCCH bearing a DL grant.

In an example embodiment, under a condition that the M-PDCCH is the M-PDCCH bearing the UL grant, the common information field includes at least one of: an MCS and redundancy version information field, a resource allocation information field, a carrier indicator information field, a new data indicator information field, an UL DMRS information field, a CSI request information field, an SRS request information field and a frequency hopping indicator information field; and/or under a condition that the M-PDCCH is the M-PDCCH bearing the DL grant, the common information field includes at least one of: an MCS information field, an HARQ process number information field, a resource allocation information field, a carrier indicator information field, a new data indicator information field, a redundancy version information field and an SRS request information field.

In an example embodiment, the configuration unit includes: a first sequencing module, configured to sequence the common information field and the UE-specific information field according to a predefined arrangement order of the common information field and the UE-specific information field in the control information format of the M-PDCCH; or a second sequencing module, configured to sequence the UE-specific information fields of various pieces of UE according to a predefined arrangement order of the UE-specific information fields of various pieces of UE in the N pieces of UE.

In an example embodiment, under a condition that the common information field includes a resource allocation information field, the resource allocation information field is used for indicating one group of resources, wherein the one group of resources includes N parts of sub-resources, and the N parts of sub-resources are transmitted to the N pieces of UE according to a predefined resource indication rule, wherein one-to-one correspondence exists between the N parts of sub-resources and the N pieces of UE.

In an example embodiment, the one group of resources are continuous resources, or the one group of resources include N clusters of resources, wherein resources of each cluster in the N clusters of resources are continuous resources on a frequency band, and different clusters of resources are discontinuous.

In an example embodiment, the grant signalling sent by the first sending unit includes: a shared grant signalling; and the device further includes: a second sending unit, configured to send a common grant signalling to the N pieces or UE, and/or a third sending unit, configured to send a UE-specific grant signalling to each of one or more pieces of UE in the N pieces of UE.

In an example embodiment, the first sending unit includes: a first sending module, configured to send, through the M-PDCCH, the shared grant signalling to the N pieces of UE in a search space shared by the N pieces of UE; the second sending unit includes: a second sending module, configured to send the common grant signalling to the N pieces of the UE in a common search space; and the third sending unit includes: a third sending module, configured to send the UE-specific grant signalling in one or more of the common search space, the search space shared by the N pieces of the UE and a UE-specific search space.

According to another aspect of the embodiments of the present disclosure, a device for acquiring a grant signalling is provided, which includes: a detection unit, configured to detect an M-PDCCH, wherein the M-PDCCH is used for sending a grant signalling to N pieces of UE, and N is a positive integer more than 1; and a first acquisition unit, configured to acquire the grant signalling in the M-PDCCH.

In an example embodiment, the first acquisition unit includes: an acquisition module, configured to acquire the grant signalling according to a control information format of the M-PDCCH, wherein the control information format includes: a common information field and/or a UE-specific information field, wherein the common information field and/or the UE-specific information field contains the grant signalling.

In an example embodiment, the device further includes: a determination unit, configured to, under a condition that the common information field includes a resource allocation information field, determine, according to a predefined resource indication rule, one part of sub-resources corresponding to a piece of UE, where the determination unit locates, in one group of resources indicated by the resource allocation information field, wherein the one group of resources includes N parts of sub-resources, wherein one-to-one correspondence exists between the N parts of sub-resources and the N pieces of UE.

In an example embodiment, the determination unit includes: a first determination module, configured to determine one part of sub-resources corresponding to the UE according to an index corresponding to the UE; or a second determination module, configured to perform a modulo operation taking a C-RNTI of the UE as a dividend and N as a divisor, and determine one part of sub-resources corresponding to the UE according to a correspondence between the value obtained by the modulo operation and its corresponding part of sub-resources.

In an example embodiment, the one group of resources are continuous resources, or the one group of resources include N clusters of resources, wherein resources of each cluster in the N clusters of resources are continuous resources on a frequency band, and different clusters of resources are discontinuous.

In an example embodiment, the device further includes: a communication unit, configured to, after the grant signalling in the M-PDCCH is acquired, communicate with an eNodeB according to a manner indicated by the common information field and/or the UE-specific information field.

In an example embodiment, the detection unit includes: a detection module, configured to detect the M-PDCCH according to an M-RNTI configured by an eNodeB.

In an example embodiment, the grant signalling acquired by the first acquisition unit includes: a shared grant signalling; and the device further includes a second acquisition unit, configured to acquire a common grant signalling, and/or a third acquisition unit, configured to acquire a UE-specific grant signalling.

In an example embodiment, the first acquisition unit includes: a first acquisition module, configured to detect the M-PDCCH in a search space shared by the N pieces of UE to acquire the shared grant signalling; the second acquisition unit includes: a second acquisition module, configured to acquire the common grant signalling in a common search space; and the third acquisition unit includes: a third acquisition module, configured to acquire the UE-specific grant signalling in one of manners as follows: acquiring the UE-specific grant signalling in the common search space, or acquiring the UE-specific grant signalling in the common search space and a UE-specific search space, or acquiring the UE-specific grant signalling in the common search space, the search space shared by the N pieces of UE and the UE-specific search space.

In the embodiments of the present disclosure, the grant signalling is sent to multiple pieces of UE through one M-PDCCH, so that overall PDCCH overhead is reduced, the technical problem that data throughput and spectral efficiency of the system are reduced by higher PDCCH overhead caused by the fact that one PDCCH or EPDCCH signalling can be granted to only one piece of UE in a related technology is solved, and the technical effect of improving the data throughput and spectral efficiency of the system is achieved.

BRIEF DESCRIPTION OF THE DRAWINGS

The drawings described here are adopted to provide further understanding of the embodiment of the present disclosure, and form a part of the present disclosure. Schematic embodiments of the present disclosure and description thereof are adopted to explain the present disclosure and not intended to form improper limits to the present disclosure. In the drawings.

DETAILED DESCRIPTION OF THE EMBODIMENTS

The present disclosure is described below with reference to the drawings and embodiments in detail. It is important to note that the embodiments in the present disclosure and characteristics in the embodiments can be combined under the condition of no conflicts.

Figure 1:
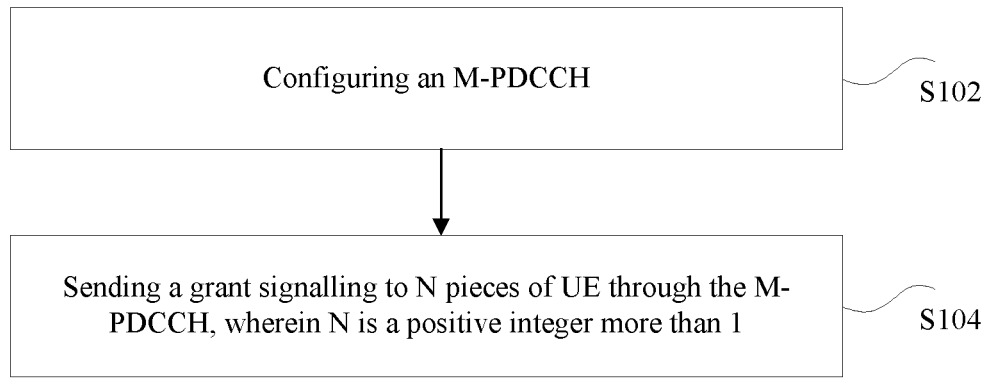
FIG. 1 is an example flowchart of a method for sending a grant signalling according to an embodiment of the present disclosure.

An embodiment of the present disclosure provides an example method for sending a grant signalling, and as shown in FIG. 1, the method includes the following steps:

Step S102: configuring an M-PDCCH; and

Step S104: sending a grant signalling to N pieces of UE through the M-PDCCH, wherein N is a positive integer more than 1.

In the example embodiment, the grant signalling is sent to multiple pieces of UE through one M-PDCCH, so that overall PDCCH overhead is reduced, the technical problem that data throughput and spectral efficiency of the system are reduced by higher PDCCH overhead caused by the fact that one PDCCH or EPDCCH signalling can be granted to only one piece of UE in the related technology is solved, and the technical effect of improving the data throughput and spectral efficiency of the system is achieved.

In an example embodiment, a control information format (e.g., DCI format) of the M-PDCCH may include, but not limited to: a common information field and/or a UE-specific information field, wherein the common information field and/or the UE-specific information field contains the grant signalling. In an example embodiment, there may be one or more common information fields in the control information format of the M-PDCCH which are shared by the N pieces of UE. That is, the control information format of the M-PDCCH includes at least one common information field shared by N pieces of UE, and one or more information fields except the common information field may serve as the UE-specific information field.

The M-PDCCH may include: an M-PDCCH bearing an UL grant and/or an M-PDCCH bearing a DL grant. Contents of the common information fields corresponding to the M-PDCCHs in the two forms are described below.

For an M-PDCCH bearing an UL grant, the common information field may include, but not limited to, at least one of information fields as follows: an MCS and redundancy version information field, a resource allocation information field, a carrier indicator information field, a new data indicator information field, an UL DMRS information field, a CSI request information field, an SRS request information field and a frequency hopping indicator information field.

For an M-PDCCH bearing a DL grant, the common information field may include, but not limited to, at least one of information fields as follows: an MCS information field, a HARQ process number information field, a resource allocation information field, a carrier indicator information field, a new data indicator information field, a redundancy version information field and an SRS request information field.

In an M-PDCCH configuration process, the M-PDCCH is mainly configured according to a set location order and contents of the common information field and the UE-specific information field in the corresponding DCI format. In an example embodiment, configuring one M-PDCCH includes: sequencing the common information field and the UE-specific information field according to a predefined arrangement order of the common information field and the UE-specific information field in the control information format of the M-PDCCH; or sequencing the UE-specific information fields of various pieces of UE according to a predefined arrangement order of the UE-specific information fields of various pieces of UE in the N pieces of UE. In the above process, sequencing the UE-specific information field of each piece of UE according to the predefined arrangement order of the UE-specific information field of each piece of UE in the N pieces of UE includes: configuring one index to each piece of UE in the N pieces of UE, and sequencing the UE-specific information field of each piece of UE in the N pieces of UE according to indication of the index of each piece of UE; and/or sequencing the UE-specific information field of each piece of UE in the N pieces of UE according to N values obtained by a modulo operation taking N C-RNTIs of the N pieces of UE as dividends and N as divisors, wherein the N values obtained by the modulo operation taking the N C-RNTIs of the N pieces of UE corresponding to the same M-PDCCH as dividends and N as divisors are different from each other. That is, the arrangement order of the common information field and the UE-specific information field is predefined in the control information format of the M-PDCCH; and the UE-specific information fields of various pieces of UE in the control information format of the M-PDCCH are sequenced according to a rule, wherein sequencing according to the rule may include that: an eNodeB configures one index to each of the N pieces of UE, and then sequencing is performed according to the indexes of the N pieces of UE; or it is limited that such requirement should be met: the N values obtained by a modulo operation taking N C-RNTIs corresponding to the N pieces of UE on the same M-PDCCH as dividends and N as divisors, i.e., (C-RNTI mod N), should be different from each other, and then sequencing is performed according to numerical values of C-RNTIs mod N.

The eNodeB configures an RNTI (recorded as an M-RNTI) shared by the N pieces of UE to the N pieces of UE, and the M-RNTI is used for detecting the M-PDCCH. In an example embodiment, the method further includes: configuring one M-RNTI to the N pieces of UE through a high-layer signalling, wherein the M-RNTI corresponds to the M-PDCCH.

In an implementation process, the M-PDCCH may employ the resource allocation information field as the common information field, and the resource allocation information field is used for indicating one group of resources, wherein the one group of resources includes N parts of sub-resources, and the N parts of sub-resources are transmitted to the N pieces of UE according to a predefined resource indication rule, wherein one-to-one correspondence exists between the N parts of sub-resources and the N pieces of UE. In an example embodiment, the predefined resource indication rule may include that: each piece of UE in the N pieces of UE corresponds to one index respectively, and one-to-one correspondence exists between indexes of the N pieces of UE and the N parts of sub-resources; and/or a modulo operation is performed taking N C-RNTIs of the N pieces of UE as dividends and N as divisors, and one-to-one correspondence exists between N values obtained by the modulo operation and the N parts of sub-resources, wherein the N values obtained by the modulo operation taking the N C-RNTIs of the N pieces of UE corresponding to the same M-PDCCH as dividends and N as divisors are different from each other.

In an example embodiment, the one-to-one correspondence between the N parts of sub-resources and the N pieces of UE in the predefined resource indication rule may be changed along with a change in a subframe index. For example: the correspondence is constructed according to (C-RNTI+SubframeIndex) mod N or (Signal+SubframeIndex) mod N, wherein SubframeIndex represents the subframe index, and Signal represents a predefined value.

In an example embodiment, the one group of resources are continuous resources, or the one group of resources include N clusters of resources, wherein resources of each cluster in the N clusters of resources are continuous resources on a frequency band, different clusters of resources are discontinuous, and each cluster of resources is namely one part of sub-resources; or the one group of resources indicated by the resource allocation information field is equally divided into N parts of sub-resources according to a predefined rule, wherein the predefined rule may include: sequential division and extraction at preset intervals. In an example embodiment, the correspondence between the N parts of sub-resources and the N pieces of UE may be indicated by adding one resource exchange indicator, and in another example embodiment, an indicator may further be added to indicate whether to reorganize the correspondence of the N parts of sub-resources.

The eNodeB may indicate the same resource to the N pieces of UE through the resource allocation information field, and the N pieces of UE perform data communication with an eNodeB on the same resource by virtue of a multi-user MIMO multi-antenna technology. In an example embodiment, a correspondence between each piece of UE in the N pieces of UE and antenna ports may be determined according to at least one piece of the following predefined information: signalling, C-RNTI, subframe index, and predefined value.

In an example embodiment, a payload of a control information format (e.g., DCI format Payload) of the M-PDCCH is the same as a payload of a certain control information format for single-user grant.

In each example embodiments as mentioned above, the M-PDCCH may include: a single-TTI grant M-PDCCH and a multi-TTI grant M-PDCCH.

In an example embodiment, the M-PDCCH may support multi-user scheduling and may also support single-user scheduling, and a scheduling manner for the M-PDCCH may be indicated by an RNTI and/or CRC for scrambling the M-PDCCH.

It is mainly shared grant signalling transmitted through the M-PDCCH, and if communication is required, common grant signalling and UE-specific grant signalling may be further required. That is, the method further includes: sending a common grant signalling to the N pieces or UE and/or sending a UE-specific grant signalling to each of one or more pieces of UE in the N pieces of UE, wherein one or more of the shared grant signalling, the UE-specific grant signalling and the common grant signalling are sent to the N pieces of UE. That is, in one DL subframe, the UE-specific grant signalling (specific for one UE), the shared grant signalling (shared by multiple pieces of UE) and the common grant signalling (common to all the UE) may be simultaneously transmitted, or any two of the three may be transmitted, or any one of the three may be transmitted, or none of the three is transmitted.

In an example embodiment, the shared grant signalling may be sent in a manner of: sending, through the M-PDCCH, the shared grant signalling to the N pieces of UE in a search space shared by the N pieces of UE; the common grant signalling may be sent in a manner of: sending the common grant signalling to the N pieces of the UE in a common search space; and the UE-specific grant signalling may be sent in a manner of: sending the UE-specific grant signalling in one or more of the common search space, the search space shared by the N pieces of the UE and a UE-specific search space.

In each example embodiments mentioned above, the value of N may be notified to the UE through an RRC signalling.

Figure 2:
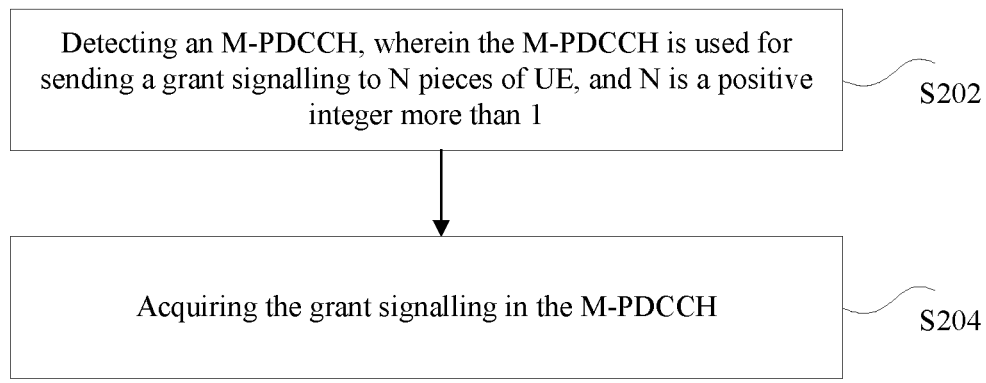
FIG. 2 is an example flowchart of a method for acquiring a grant signalling according to an embodiment of the present disclosure.

In another example embodiment, an example method for acquiring a grant signalling is further provided, and from a UE side, as shown in FIG. 2, the method includes the following steps:

Step S202: detecting an M-PDCCH, wherein the M-PDCCH is used for sending a grant signalling to N pieces of UE, and N is a positive integer more than 1; and Step S204: acquiring the grant signalling in the M-PDCCH.

In an example embodiment, acquiring the grant signalling in the M-PDCCH in Step S204 may include: acquiring the grant signalling according to a control information format of the M-PDCCH, wherein the control information format includes: a common information field and/or a UE-specific information field, wherein the common information field and/or the UE-specific information field contains the grant signalling.

In an example embodiment, under a condition that the common information field includes a resource allocation information field, a piece of UE determines, according to a predefined resource indication rule, one part of sub-resources corresponding to the UE itself in one group of resources indicated by the resource allocation information field, wherein the one group of resources includes N parts of sub-resources, wherein one-to-one correspondence exists between the N parts of sub-resources and the N pieces of UE. In this example embodiment, the one group of resources is divided into the N parts of sub-resources in, but not limited to, at least one of manners as follows: sequential division and extraction at preset intervals.

In an example embodiment, the UE determining, according to the predefined resource indication rule, one part of sub-resources corresponding to the UE itself in the one group of resources indicated by the resource allocation information field includes: the UE determining one part of sub-resources corresponding to the UE itself according to an index corresponding to the UE; or the UE performing a modulo operation taking its own C-RNTI as a dividend and N as a divisor, and determining one part of sub-resources corresponding to the UE itself according to a correspondence between the value obtained by the modulo operation and its corresponding part of sub-resources.

In an example embodiment, the one group of resources are continuous resources, or the one group of resources include N clusters of resources, wherein resources of each cluster in the N clusters of resources are continuous resources on a frequency band, and different clusters of resources are discontinuous.

In an example embodiment, after Step S204, the method may further include: after the grant signalling in the M-PDCCH is acquired, communicating with an eNodeB according to a manner indicated by the common information field and/or the UE-specific information field.

In an example embodiment, in Step S202, the M-PDCCH may be detected, according to an M-RNTI configured by an eNodeB, to acquire the common information field and/or the UE-specific information field, and communication with the eNodeB may be performed according to the manner indicated by the acquired common information field and/or UE-specific information field.

Before communication, not only a shared grant signalling is required to be acquired, and common grant signalling and/or UE-specific grant signalling are/is also required to be acquired sometimes. The shared grant signalling may be acquired in a manner of: detecting the M-PDCCH in a search space shared by the N pieces of UE to acquire the shared grant signalling; the common grant signalling may be acquired in a manner of: acquiring the common grant signalling in a common search space; and the UE-specific grant signalling may be acquired in one of manners as follows: acquiring the UE-specific grant signalling in the common search space, or acquiring the UE-specific grant signalling in the common search space and a UE-specific search space, or acquiring the UE-specific grant signalling in the common search space, the search space shared by the N pieces of UE and the UE-specific search space.

In each example embodiments above, the M-PDCCH may be transmitted on a PDCCH, and may be transmitted on an EPDCCH alternatively, wherein each M-PDCCH corresponds to one control information format.

Figure 3:
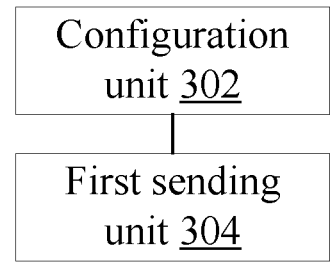
FIG. 3 is an example structure diagram of a device for sending a grant signalling according to an embodiment of the present disclosure.

In another embodiment, a device for sending a grant signalling is further provided, which is preferably located in an eNodeB and configured to implement the abovementioned embodiments and example embodiments, and what has been described will not be repeated. For example, a term "unit" or "module", used below, is a combination of software and/or hardware capable of realizing preset functions. The device described in the following embodiment is preferably implemented by software, but the implementation of the device with hardware or the combination of software and hardware is also possible and conceivable. FIG. 3 is an example structure diagram of a grant signaling sending device according to an embodiment of the present disclosure, and as shown in FIG. 3, the device includes: a configuration unit 302 and a first sending unit 304. The structure is described below.

The configuration unit 302 is configured to configure an M-PDCCH; and the first sending unit 304 is coupled with the configuration unit 302, and is used for sending a grant signalling to N pieces of UE through the M-PDCCH, wherein N is a positive integer more than 1.

In an example embodiment, the configuration unit 302 includes: a first sequencing module, configured to sequence a common information field and a UE-specific information field according to a predefined arrangement order of the common information field and the UE-specific information field in a control information format of the M-PDCCH; or a second sequencing module, configured to sequence the UE-specific information fields of various pieces of UE according to a predefined arrangement order of the UE-specific information fields of various pieces of UE in the N pieces of UE.

In an example embodiment, the grant signalling sent by the first sending unit 304 includes: a shared grant signalling; and the device further includes: a second sending unit, configured to send a common grant signalling to the N pieces or UE, and/or a third sending unit, configured to send a UE-specific grant signalling to each of one or more pieces of UE in the N pieces of UE.

In an example embodiment, the first sending unit 304 includes: a first sending module, configured to send, through the M-PDCCH, the shared grant signalling to the N pieces of UE in a search space shared by the N pieces of UE; the second sending unit includes: a second sending module, configured to send the common grant signalling to the N pieces of the UE in a common search space; and the third sending unit includes: a third sending module, configured to send the UE-specific grant signalling in one or more of the common search space, the search space shared by the N pieces of the UE and a UE-specific search space.

Figure 4:
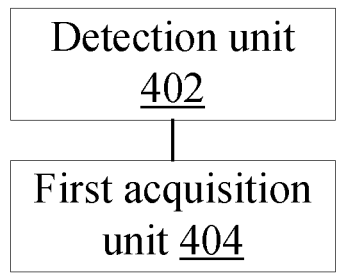
FIG. 4 is an example structure diagram of a device for acquiring a grant signalling according to an embodiment of the present disclosure.

Another embodiment of the present disclosure further provides a device for acquiring a grant signalling, which is preferably located in UE and, as shown in FIG. 4, includes: a detection unit 402, configured to detect an M-PDCCH, wherein the M-PDCCH is used for sending a grant signalling to N pieces of UE, and N is a positive integer more than 1; and a first acquisition unit 404, coupled with the detection unit 402 and configured to acquire the grant signalling in the M-PDCCH.

In an example embodiment, the first acquisition unit 404 includes: an acquisition module, configured to acquire the grant signalling according to a control information format of the M-PDCCH, wherein the control information format includes: a common information field and/or a UE-specific information field, wherein the common information field and/or the UE-specific information field contains the grant signalling.

In an example embodiment, the device further includes: a determination unit, configured to, under a condition that the common information field includes a resource allocation information field, determine, according to a predefined resource indication rule, one part of sub-resources corresponding to a piece of UE, where the determination unit locates, in one group of resources indicated by the resource allocation information field, wherein the one group of resources includes N parts of sub-resources, wherein one-to-one correspondence exists between the N parts of sub-resources and the N pieces of UE.

In an example embodiment, the determination unit includes: a first determination module, configured to determine one part of sub-resources corresponding to the UE according to an index corresponding to the UE; or a second determination module, configured to perform a modulo operation taking a C-RNTI of the UE as a dividend and N as a divisor, and determine one part of sub-resources corresponding to the UE according to a correspondence between the value obtained by the modulo operation and its corresponding part of sub-resources.

In an example embodiment, the one group of resources are continuous resources, or the one group of resources include N clusters of resources, wherein resources of each cluster in the N clusters of resources are continuous resources on a frequency band, and different clusters of resources are discontinuous.

Figure 5:
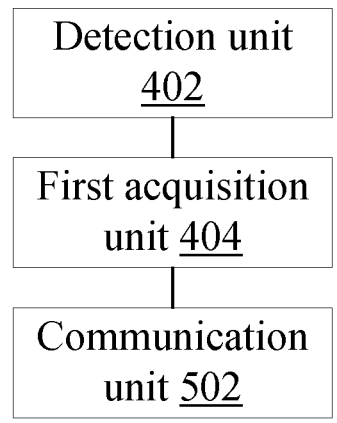
FIG. 5 is another example structure diagram of a device for acquiring a grant signalling according to an embodiment of the present disclosure.

In an example embodiment, as shown in FIG. 5, the device further includes: a communication unit 502, coupled with the first acquisition unit 404 and configured to, after the grant signalling in the M-PDCCH is acquired, communicate with an eNodeB according to a manner indicated by the common information field and/or the UE-specific information field.

In an example embodiment, the detection unit includes: a detection module, configured to detect the M-PDCCH according to an M-RNTI configured by an eNodeB.

In an example embodiment, the grant signalling acquired by the first acquisition unit includes: a shared grant signalling; and the device further includes a second acquisition unit, configured to acquire a common grant signalling, and/or a third acquisition unit, configured to acquire a UE-specific grant signalling, wherein the first acquisition unit may include: a first acquisition module, configured to detect the M-PDCCH in a search space shared by the N pieces of UE to acquire the shared grant signalling; the second acquisition unit includes: a second acquisition module, configured to acquire the common grant signalling in a common search space; and the third acquisition unit includes: a third acquisition module, configured to acquire the UE-specific grant signalling in one of manners as follows: acquiring the UE-specific grant signalling in the common search space, or acquiring the UE-specific grant signalling in the common search space and a UE-specific search space, or acquiring the UE-specific grant signalling in the common search space, the search space shared by the N pieces of UE and the UE-specific search space.

The physical downlink control information (DCI) of an LTE system consists of multiple information fields, and the numbers of information fields and bit overhead of each information field in different DCI formats are different, specifically as shown in 3GPP TS 36.212. In the DCI formats, proportions of overhead of a resource allocation information field and an MCS information field are higher, but these information fields may be the same for multiple pieces of UE, or may be jointly indicated to reduce the overhead. However, only single-UE grant signalling design is proposed in the related art, and in some circumstances, excessive DCI overhead may cause influence on throughput of the system. In consideration of the problem of high PDCCH overhead in the related art, the embodiments of the present disclosure propose a multi-user grant signalling joint sending method for reducing DCI overhead, a processing principle is to send a grant signalling to multiple pieces of UE through one M-PDCCH. Compared with sending of multiple single-user PDCCHs, the technical solution has the advantages that the overall overhead is reduced on the premise of ensuring effective indication of each necessary information field.

Figure 6:
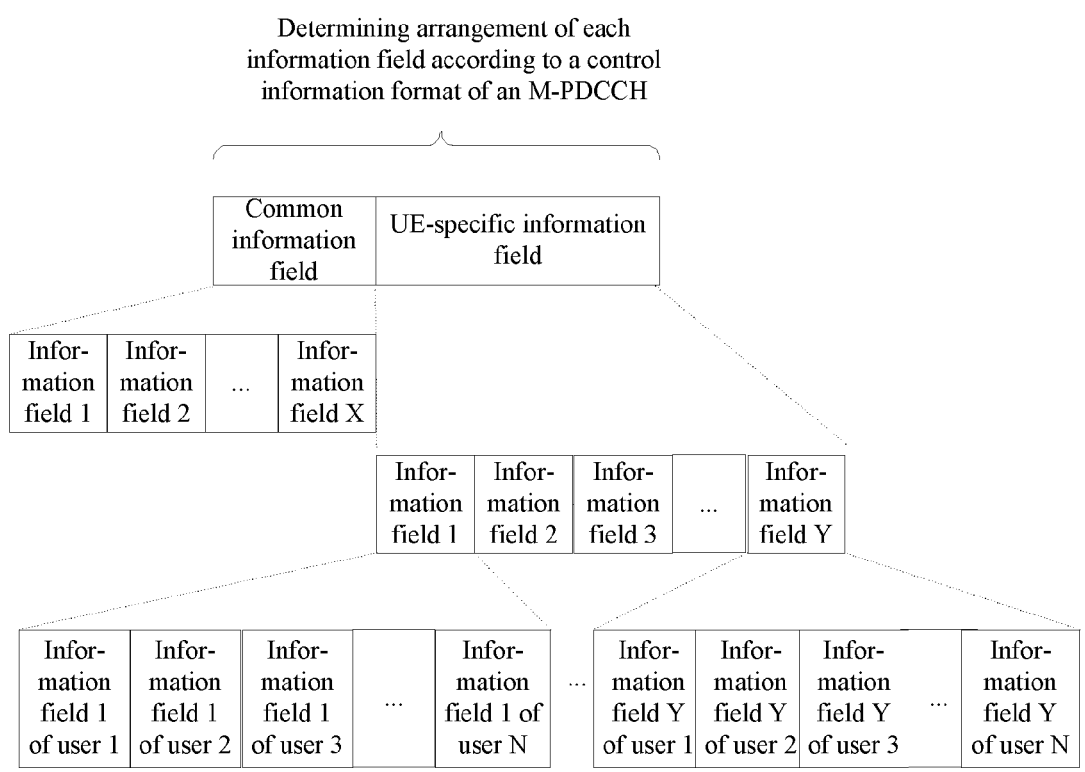
FIG. 6 is an example diagram of a control information format (e.g., DCI format) of an M-PDCCH according to an embodiment of the present disclosure.
Figure 7:
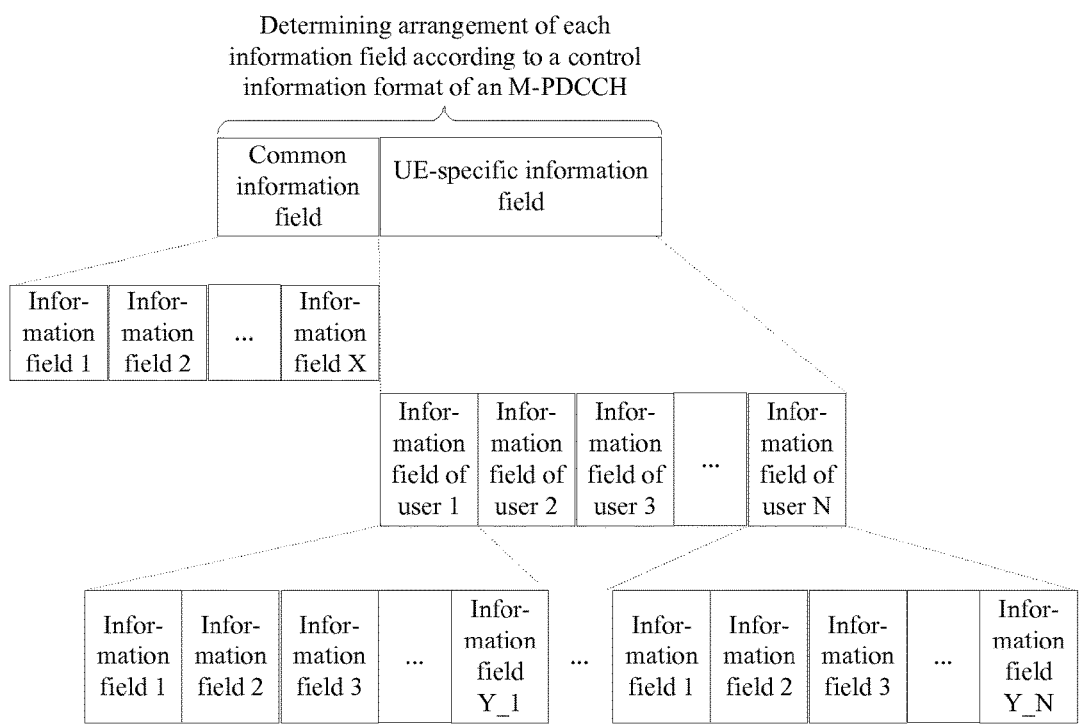
FIG. 7 is another example diagram of a control information format (e.g., DCI format) of an M-PDCCH according to an embodiment of the present disclosure.

FIG. 6 and FIG. 7 are example diagrams of a control information format (e.g., DCI format) of an M-PDCCH in a method according to an embodiment of the present disclosure. The DCI format predefines arrangement locations of a common information field and a UE-specific information field in the format: as shown in FIG. 6, the DCI format includes X common information fields and Y UE-specific information fields, wherein the X common information fields are arranged in front according to a preset rule, the Y UE-specific information fields are arranged behind according to the preset rule, and the same type of UE-specific information fields of various pieces of UE are arranged together according to a UE arrangement rule; or, as shown in FIG. 7, the DCI format includes X common information fields which are arranged in front according to a preset rule, then all the UE-specific information fields of each piece of UE are arranged according to a preset rule at first, and then all of the UE-specific information fields of various pieces of UE are arranged according to a UE arrangement rule, wherein the numbers of types of the UE-specific information fields of each piece of UE may be different, for example, Y_1 and Y_N may be adopted for representation.

Description is given below with reference to some example implementation modes.

Example Implementation Mode 1

In the example implementation mode, a multi-user UL grant signalling joint-sending method may include: pre-defining a control information format of an M-PDCCH for joint-sending UL grant signalling of two users, the control information format sequentially including the following information fields: {a resource allocation information field (common information field), a CSI request information field (common information field), an SRS request information field (common information field), a frequency hopping indicator information field (common information field), a power control command information field of the user with index 0, a power control command information field of the user with index 1, a new data indicator information field of the user with index 0, a new data indicator information field of the user with index 1, an MCS and redundancy version information field of the user with index 0, an MCS and redundancy version information field of the user with index 1, an UL DMRS information field of the user with index 0, an UL DMRS information field of the user with index 11, wherein the sequence of the information fields is not limited as long as a fixed sequence is predetermined, and an eNodeB and UE both follow the sequence of the information fields in the control information format.

The eNodeB pairs and groups a part of UE in a connected state according to a current condition, and configures one M-RNTI for each group through a high-layer signalling, wherein M-PDCCHs are in one-to-one correspondence with M-RNTIs, and the two users in the group can detect the M-PDCCH bearing their UL grant according to the M-RNTI. In addition, indexes, i.e. index 0 and index 1, are respectively configured to the two users in each group through a high-layer signalling, and each user in the group can acquire information in its own UE-specific information field only according to the index. The information in the common information fields is acquired by both users.

Figure 8:
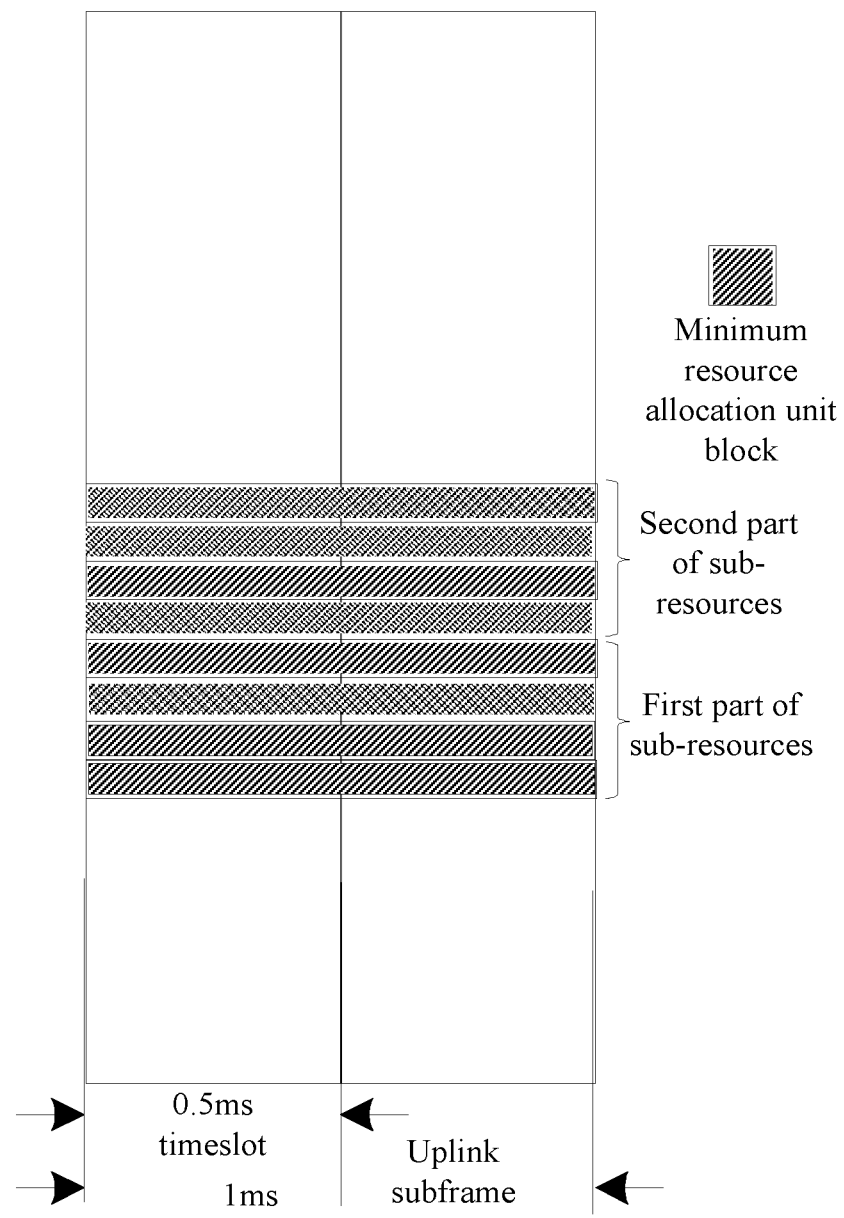
FIG. 8 is an example diagram showing the use of a common information field according to an embodiment of the present disclosure.

The eNodeB indicates one group of resources through the resource allocation information field, as shown in FIG. 8, the one group of resources is equally divided into two parts, and according to higher and lower locations on frequency band, the lower resources are determined to be the first part of sub-resources, which are the resources allocated to the user with index 0, and the sub-resources of the second part are resources allocated to the user with index 1. As an example implementation, in order to improve resource allocation flexibility, a 1-bit exchange indicator used for indicating whether to perform resource exchange or not may be added into the resource allocation information field, when the exchange indicator is 0, it is indicated that no resources are exchanged, and the sub-resources of the first part are still the resources allocated to the user with index 0, and when the exchange indicator is 1, it is indicated to exchange the resources, and the sub-resources of the first part become the resources allocated to the user with index 1. FIG. 8 shows a group of resources which are continuous on frequency band, and the content in FIG. 8 only serves as an example, and the resource allocation information field may indicate a group of continuous resources or a group of discrete resources according to a resource allocation method. The other information fields in the common information fields indicate completely the same content for the two users.

Example Implementation Mode 2

In the example implementation mode, a multi-user UL grant signalling joint-sending method may include: predefining a control information format of an M-PDCCH for joint-sending UL grant signalling of two users, the control information format sequentially including the following information fields: {a resource allocation information field (common information field), a CSI request information field (common information field), an SRS request information field (common information field), a frequency hopping indicator information field (common information field), an UL DMRS information field (common information field), a power control command information field of user 1, a power control command information field of user 2, a new data indicator information field of user 1, a new data indicator information field of user 2, an MCS and redundancy version information field of user 1, an MCS and redundancy version information field of user 2}, wherein the sequence of the information fields is not limited as long as a fixed sequence is predetermined, and an eNodeB and UE both follow the sequence of the information fields in the control information format.

The eNodeB pairs and groups a part of UE in a connected state according to a current condition, and configures one M-RNTI for each group through a high-layer signalling, wherein M-PDCCHs are in one-to-one correspondence with M-RNTIs, and the two users in the group can detect the M-PDCCH bearing their UL grant according to the M-RNTI. It is appointed that for the users paired into the same group, if a corresponding C-RNTI mod 2=0, the user is user 0; and if a corresponding C-RNTI mod 2=1, the user is user 1. The users acquire information in their own UE-specific information fields from the control information format of the M-PDCCH according to such an appointed relationship. The information in the common information fields is acquired by both users.

Figure 9:
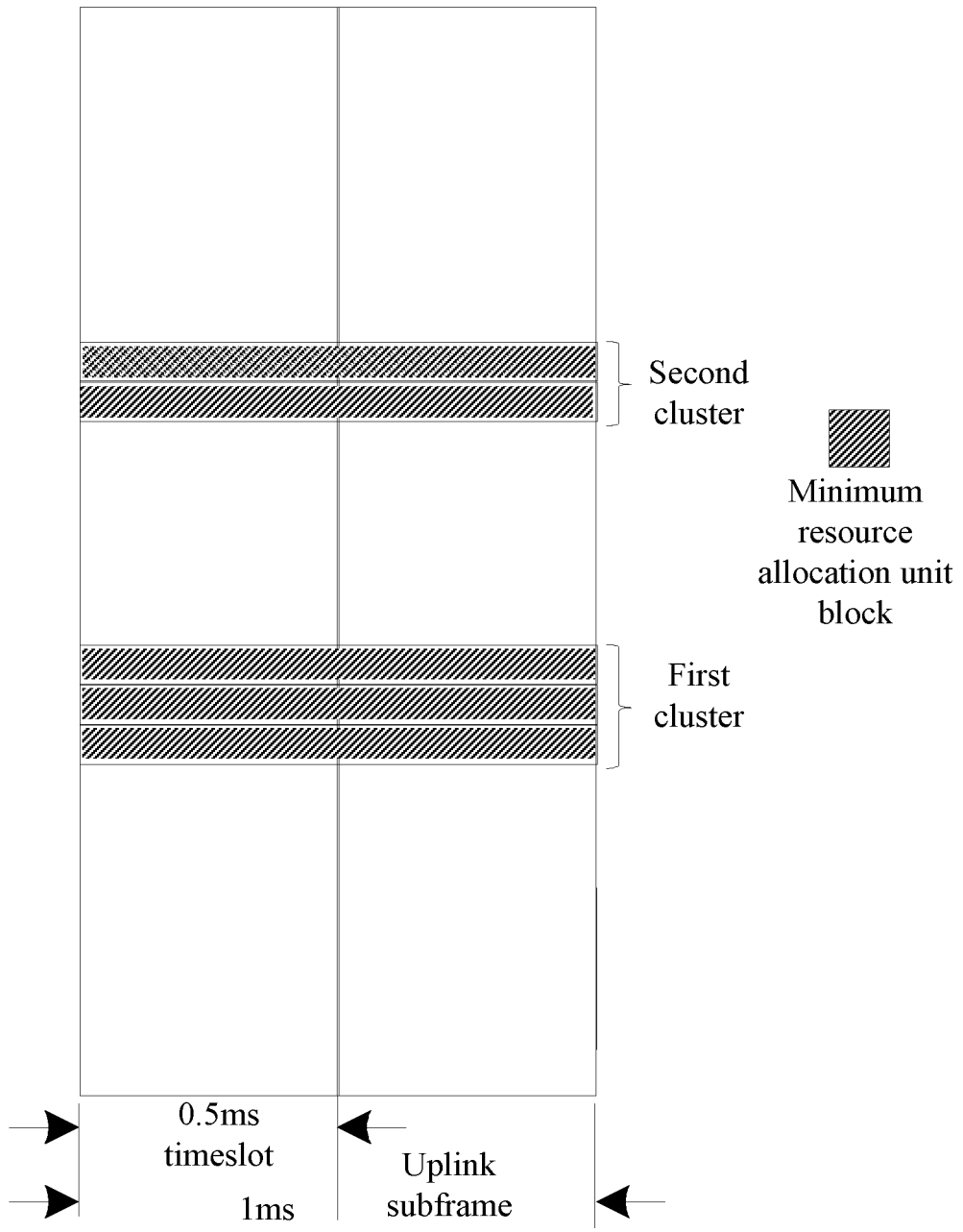
FIG. 9 is another example diagram showing the use of a common information field according to an embodiment of the present disclosure.

The eNodeB indicates one group of resources through the resource allocation information field, as shown in FIG. 9, the one group of resources always includes two clusters, each cluster is a part of continuous resources, the two clusters are discontinuous, and the sizes of the two clusters of resources may be different, and is indicated by a resource allocation manner. It is pre-appointed that according to higher and lower locations on frequency band, the lower resources are determined to be the first part of sub-resources, which are the resources allocated to user 0, and the sub-resources of the second part are resources allocated to user 1. As an example implementation, in order to improve resource allocation flexibility, a 1-bit exchange indicator used for indicating whether to perform resource exchange or not may be added into the resource allocation information field, when the exchange indicator is 0, it is indicated that no resources are exchanged, and the sub-resources of the first part are still the resources allocated to user 0, and when the exchange indicator is 1, it is indicated to exchange the resources, and the sub-resources of the first part become the resources allocated to user 1. The other information fields in the common information fields indicate completely the same content for the two users.

Example Implementation Mode 3

In the example implementation mode, a multi-user UL grant signalling joint-sending method may include: predefining a control information format of an M-PDCCH for joint-sending UL grant signalling of two users, the control information format sequentially including the following information fields: {a resource allocation information field (common information field), a CSI request information field (common information field), an SRS request information field (common information field), a frequency hopping indicator information field (common information field), a power control command information field of the user with index 0, a power control command information field of the user with index 1, a new data indicator information field of the user with index 0, a new data indicator information field of the user with index 1, an MCS and redundancy version information field of the user with index 0, an MCS and redundancy version information field of the user with index 1, an UL DMRS information field of the user with index 0, an UL DMRS information field of the user with index 11, wherein the sequence of the information fields is not limited as long as a fixed sequence is predetermined, and an eNodeB and UE both follow the sequence of the information fields in the control information format.

The eNodeB pairs and groups a part of UE in a connected state according to a current condition, and configures one M-RNTI for each group through a high-layer signalling, wherein M-PDCCHs are in one-to-one correspondence with M-RNTIs, and the two users in the group can detect the M-PDCCH bearing an UL grant according to the M-RNTI. In addition, indexes, i.e. index 0 and index 1, are respectively configured to the two users in each group through a high-layer signalling, and each user in the group can acquire information in its own UE-specific information field only according to the index. The information in the common information fields is acquired by both users.

The eNodeB indicates one group of resources through the resource allocation information field, and the eNodeB assigns that various users use the group of resources together. The two users perform data communication with the eNodeB on the same resource by virtue of a multi-user MIMO multi-antenna technology, and the UE configures high-orthogonality reference signals for distinguishing the users through the UL DMRS information fields. Antenna ports and/or DMRS sequences corresponding to each user are determined according to predefined information, wherein the predefined information includes, but not limited to, at least one of: signalling (RRC), C-RNTIs and a subframe index.

Example Implementation Mode 4

In the example implementation mode, an LTE-system-based multi-user UL grant signalling joint-sending method includes: predefining a control information format (called DCI format 4M) of an M-PDCCH for joint-sending UL grant signalling of two users, so that a payload of DCI format 4M is the same as a payload of DCI format 4 of an LTE PDCCH/EPDCCH, wherein the payload refers to the total number of bits of the DCI format (because CRC in both DCI formats has 16 bits, CRC is not included in the payload), and includes bits of each information field and padding bits, so as to conveniently avoid increase of PDCCH/EPDCCH blind detection times. For example, under a 20 Mhz system bandwidth, a payload of DCI format 4 supporting four antennae and only including a 1-bit CSI request is 41-bit information (in consideration of a possible 3-bit carrier indicator for carrier aggregation), and DCI format 4M sequentially includes the following information fields: {a 14-bit resource allocation information field (common information field), a 1-bit exchange indicator information field (common information field), a 1-bit frequency hopping indicator information field (common information field), a 3-bit UL DMRS information field (common information field), a 2-bit power control command information field of a user with index 0, a 2-bit power control command information field of a user with index 1, a 1-bit new data indicator information field of the user with index 0, a 1-bit new data indicator information field of the user with index 1, a 5-bit MCS and redundancy version information field of the user with index 0, a 5-bit MCS and redundancy version information field of the user with index 1, a 1-bit CSI request information field of the user with index 0, a 1-bit CSI request information field of the user with index 1, a 2-bit SRS request information field of the user with index 0, a 2-bit SRS request information field of the user with index 11. In an example embodiment, a payload of DCI format 4M is also 41 bits.

The eNodeB pairs and groups a part of users in a connected state according to a current condition, and configures one M-RNTI for each group through a high-layer signalling. The two users in the group detect the M-PDCCH of DCI format 4M according to the M-RNTI, and the two users perform M-PDCCH and single-user PDCCH/EPDCCH blind detection in a search space which is shared by the two users and determined according to the M-RNTI, and do not detect a search space determined according to C-RNTIs, so that increase of blind detection times is avoided. In addition, indexes, i.e. index 0 and index 1, are respectively configured to the two users in each group through a high-layer signalling, and each user in the group can acquire information in its own UE-specific information field only according to the index. The information in the common information fields is acquired by both users.

The eNodeB adopts a discontinuous resource allocation manner, i.e., an existing UL resource allocation type 1 to allocate two clusters through the resource allocation information field, wherein each cluster is a part of continuous resources, the two clusters are discontinuous, and the sizes of different clusters of resources may be different. The overhead of the resource allocation information field under the 20 Mhz system bandwidth is 14-bits. It is appointed that according to higher and lower locations on frequency band, the lower cluster is determined to be the first part of sub-resources which are the resources allocated to user 0, and the sub-resources of the second part are resources allocated to user 1. The 1-bit exchange indication information improves resource allocation flexibility. A 1-bit exchange indicator used for indicating whether to perform resource exchange or not may be added into the resource allocation information field, when the exchange indicator is 0, it is indicated that no resources are exchanged, and the sub-resources of the first part are still the resources allocated to the user with index 0, and when the exchange indicator is 1, it is indicated to exchange the resources, and the sub-resources of the first part become the resources allocated to the user with index 1. The other information fields in the common information fields indicate completely the same content for the two users.

In an example implementation, the M-PDCCH may be a single-TTI grant M-PDCCH or a multi-TTI grant M-PDCCH, and a high-layer signalling semi-static configuration manner may be adopted to configure whether the M-PDCCH is effective in single-TTI grant or 2 or 4-TTI grant, so that overhead of LTE control signalling is further reduced.

Example Implementation Mode 5

In the example implementation mode, an LTE-system-based multi-user DL grant signalling joint-sending method includes: predefining a control information format (called DCI format 2M) of an M-PDCCH for joint-sending DL grant signalling of two users. The DCI format 2M at least includes one common information field, and a payload of DCI format 2M is made the same as a payload of DCI format 4 of an LTE PDCCH/EPDCCH.

An eNodeB pairs and groups a part of users in a connected state according to a current condition, and configures one M-RNTI for each group through a high-layer signalling. The two users in the group detect the M-PDCCH corresponding to DCI format 2M according to the M-RNTI, and the two users perform M-PDCCH and single-user PDCCH/EPDCCH blind detection in a search space which is shared by the two users and determined according to the M-RNTI, and do not detect a search space determined according to C-RNTIs, so that increase of blind detection times is avoided. In addition, indexes, i.e. index 0 and index 1, are respectively configured to the two users in each group through a high-layer signalling, and each user in the group can acquire information in its own UE-specific information field only according to the index. The information in the common information fields is acquired by both users.

The eNodeB allocates 2 clusters on the basis of a certain existing-LTE-based resource allocation type through a resource allocation information field, wherein each cluster is a part of continuous resources, the two clusters are discontinuous, and the sizes of different clusters of resources may be different. It is appointed that according to higher and lower locations on frequency band, the lower cluster is determined to be the first part of sub-resources which are resources allocated to user 0, and the sub-resources of the second part are resources allocated to user 1. The 1-bit exchange indication information field improves resource allocation flexibility. A 1-bit exchange indicator used for indicating whether to perform resource exchange or not may be added into the resource allocation information field, when the exchange indicator is 0, it is indicated that no resources are exchanged, and the sub-resources of the first part are still the resources allocated to the user with index 0, and when the exchange indicator is 1, it is indicated to exchange the resources, and the sub-resources of the first part become the resources allocated to the user with index 1. The other information fields in the common information fields indicate completely the same content for the two users.

Example Implementation Mode 6

In the example implementation mode, a multi-user UL grant signalling joint-sending method includes: predefining a control information format of an M-PDCCH for joint-sending UL grant signalling of three users, the control information format sequentially including the following information fields: {a resource allocation information field (common information field), a CSI request information field (common information field), an SRS request information field (common information field), a frequency hopping indicator information field (common information field), an UL DMRS information field (common information field), a power control command information field of user 1, a power control command information field of user 2, a power control command information field of user 3, a new data indicator information field of user 1, a new data indicator information field of user 2, a new data indicator information field of user 3, an MCS and redundancy version information field of user 1, an MCS and redundancy version information field of user 2, an MCS and redundancy version information field of user 31, wherein the sequence of the information fields is not limited as long as a fixed sequence is predetermined, and an eNodeB and UE both follow the sequence of the information fields in the control information format.

The eNodeB groups a part of UE in a connected state according to a current condition, and configures one M-RNTI for each group through a high-layer signalling, wherein M-PDCCHs are in one-to-one correspondence with M-RNTIs, and the three users in the group can detect the M-PDCCH bearing an UL grant according to the M-RNTI. It is appointed that for the three users in the same group, if the corresponding C-RNTI mod 3=0, the user is user 0, if the corresponding C-RNTI mod 3=1, the user is user 1, and if the corresponding C-RNTI mod 3=2, the user is user 2. The UE acquires information in its own UE-specific information field from the control information format of the M-PDCCH according to such an appointed relationship, and information in the common information fields is acquired by the three users.

The eNodeB indicates one group of resources through the resource allocation information field, the one group of resources always includes three clusters, each cluster is a part of continuous resources, the three clusters are discontinuous, and the sizes of different clusters of resources may be different, and are indicated by a resource allocation manner. It is appointed that according to higher and lower locations on frequency band, the lower cluster is determined to be the first part of sub-resources which are resources allocated to user 0, the sub-resources of the second part are resources allocated to user 1, and the sub-resources of the third part are resources allocated to user 2. In addition, in order to improve resource allocation flexibility, a 2-bit exchange indicator used for indicating whether to perform resource exchange or not may be added into the resource allocation information field, when the exchange indicator is 00, it is indicated that no resources are exchanged, and the sub-resources of each part are still the resources allocated to the users with corresponding indexes; when the exchange indicator is 01, it is indicated to exchange the resources, the sub-resources of the first part become the resources allocated to the user with index 1, the sub-resources of the second part become the resources allocated to the user with index 2 and the sub-resources of the third part become the resources allocated to the user with index 0; when the exchange indicator is 10, it is indicated to exchange the resources, the sub-resources of the first part become the resources allocated to the user with index 2, the sub-resources of the second part become the resources allocated to the user with index 0 and the sub-resources of the third part become the resources allocated to the user with index 1; and when the exchange indicator is 11, it is indicated to exchange the resources, the sub-resources of the first part become the resources allocated to the user with index 1, the sub-resources of the second part become the resources allocated to the user with index 0 and the sub-resources of the third part become the resources allocated to the user with index 2. The other information fields in the common information fields indicate completely the same content for the three users.

Example Implementation Mode 7

In the example implementation mode, an LTE-system-based multi-user method for sending a grant signalling includes: predefining a control information format (called DCI format X) of an M-PDCCH for sending UL grant signalling of N users, wherein under a condition that a common information field includes a resource allocation information field, the resource allocation information field indicates the same resource to N pieces of UE, and the N pieces of UE perform data communication with an eNodeB on the same resource by virtue of a multi-user MIMO multi-antenna technology. The N pieces of UE have the same MCS level or are configured with their respective MCS levels through signalling.

A correspondence between each piece of UE in the N pieces of UE and antenna ports is determined according to at least one piece of the following predefined information: signalling, C-RNTIs, a subframe index and a predefined value. For example, the antenna ports corresponding to various pieces of UE are configured through specific RRC signalling respectively, or it is determined that different users correspond to different antenna ports according to modulo operation taking the C-RNTIs as dividends, or the manner for determining the antenna ports is changed along with a change in the subframe index. In addition, a reference signal sequence corresponding to the antenna ports may be determined according to at least one of the signalling, the C-RNTIs, the subframe index and the predefined value.

In another embodiment, software is further provided, which is configured to execute the technical solutions described in the abovementioned embodiments and example embodiments.

In another embodiment, a storage medium is further provided, in which the abovementioned software is stored, the storage medium including, but not limited to: a compact disc, a floppy disk, a hard disk, an erasable memory and the like.

From the above, it can be seen that the embodiments of the present disclosure achieve the following technical effects: the grant signalling is sent to multiple pieces of UE through one M-PDCCH, so that overall PDCCH overhead is reduced, the technical problem that data throughput and spectral efficiency of the system are reduced by higher PDCCH overhead caused by the fact that one PDCCH or EPDCCH signalling can be granted to only one piece of UE in the related technology is solved, and the technical effect of improving the data throughput and spectral efficiency of the system is achieved.

Obviously, those skilled in the art should know that each module or step of the present disclosure may be implemented by a universal computing device, and the modules or steps can be concentrated on a single computing device or distributed on a network formed by a plurality of computing devices, and may optionally be implemented by programmable codes executable for the computing devices, so that the modules or steps may be stored in a storage device for execution with the computing devices, or the shown or described steps may be executed in a sequence different from the sequence here under a certain condition, or the modules or steps may form each integrated circuit module, or multiple modules or steps therein may form a single integrated circuit module for implementation. As a consequence, the present disclosure is not limited to any specific hardware and software combination.

The above is only the example embodiment of the present disclosure and not intended to limit the present disclosure, and for those skilled in the art, the present disclosure may have various modifications and variations. Any modifications, equivalent replacements, improvements and the like within the principle of the present disclosure shall fall within the scope of protection defined by the claims of the present disclosure.

INDUSTRIAL APPLICABILITY

The technical solutions provided by the embodiments of the present disclosure may be applied to the field of communication, the technical problem that data throughput and spectral efficiency of a system are reduced by higher PDCCH overhead caused by the fact that one PDCCH or EPDCCH signalling can be granted to only one piece of UE in the related technology is solved, and the technical effect of improving the data throughput and spectral efficiency of the system is achieved.

What is claimed is:

1. A method for sending a grant signalling, comprising: configuring one Multi-Physical Downlink Control Channel (M-PDCCH); and sending a grant signalling to N pieces of User Equipment (UE) through the M-PDCCH;

wherein configuring one M-PDCCH comprises: sequencing the common information field and the UE-specific information field according to a predefined arrangement order of the common information field and the UE-specific information field in the control information format of the M-PDCCH;

wherein the sent grant signalling comprises: a shared grant signalling; wherein the method further comprises: sending a common grant signalling to the N pieces of UE, sending a UE-specific grant signalling to each of one or more pieces of UE in the N pieces of UE, or sending a common grant signalling to the N pieces of UE and sending a UE-specific grant signalling to each of one or more pieces of UE in the N pieces of UE; wherein one or more of the shared grant signalling, the UE-specific grant signalling and the common grant signalling are sent to the N pieces of UE; wherein sending the shared grant signalling comprises: sending, through the M-PDCCH, the shared grant signalling to the N pieces of UE in a search space shared by the N pieces of UE; sending the common grant signalling comprises: sending the common grant signalling to the N pieces of the UE in a common search space; and sending the UE-specific grant signalling comprises: sending the UE-specific grant signalling in one or more of the common search space, the search space shared by the N pieces of the UE and a UE-specific search space.

2. The method as claimed in claim 1, wherein a control information format of the M-PDCCH comprises: the common information field, the UE-specific information field, or the common information field and the UE-specific information field wherein the common information field, the UE-specific information field, or the common information field and a UE-specific information field contains the grant signalling.

3. The method as claimed in claim 2, wherein there are one or more common information fields which are shared by the N pieces of UE.

4. The method as claimed in claim 2, wherein the M-PDCCH comprises: an M-PDCCH bearing an UpLink (UL) grant, an M-PDCCH, or an UpLink (UL) grant and an M-PDCCH bearing a DownLink (DL) grant.

5. The method as claimed in claim 4, wherein under a condition that the M-PDCCH is the M-PDCCH bearing the UL grant, the common information field comprises at least one of: a Modulation and Coding Scheme (MCS) and redundancy version information field, a resource allocation information field, a carrier indicator information field, a new data indicator information field, an UL Demodulation Reference Signal (DMRS) information field, a Channel State Information (CSI) request information field, a Sounding Reference Signal (SRS) request information field and a frequency hopping indicator information field or, under a condition that the M-PDCCH is the M-PDCCH bearing the DL grant, the common information field comprises at least one of: an MCS information field, a Hybrid Automatic Repeat Request (HARQ) process number information field, a resource allocation information field, a carrier indicator information field, a new data indicator information field, a redundancy version information field and an SRS request information field;

or, under a condition that the M-PDCCH is the M-PDCCH bearing the UL grant, the common information field comprises at least one of: a Modulation and Coding Scheme (MCS) and redundancy version information field, a resource allocation information field, a carrier indicator information field, a new data indicator information field, an UL Demodulation Reference Signal (DMRS) information field, a Channel State Information (CSI) request information field, a Sounding Reference Signal (SRS) request information field and a frequency hopping indicator information field, and under a condition that the M-PDCCH is the M-PDCCH bearing the DL grant, the common information field comprises at least one of: an MCS information field, a Hybrid Automatic Repeat Request (HARQ) process number information field, a resource allocation information field, a carrier indicator information field, a new data indicator information field, a redundancy version information field and an SRS request information field.

6. The method as claimed in claim 1, wherein sequencing the UE-specific information field of each piece of UE according to the predefined arrangement order of the UE-specific information field of each piece of UE in the N pieces of UE comprises:

configuring one index to each piece of UE in the N pieces of UE, and sequencing the UE-specific information field of each piece of UE in the N pieces of UE according to indication of the index of each piece of UE; or, sequencing the UE-specific information field of each piece of UE in the N pieces of UE according to N values obtained by a modulo operation taking N Cell Radio Network Temporary Identifiers (C-RNTI) of the N pieces of UE as dividends and N as divisors, wherein the N values obtained by the modulo operation taking the N C-RNTIs of the N pieces of UE corresponding to the same M-PDCCH as dividends and N as divisors are different from each other;

or, configuring one index to each piece of UE in the N pieces of UE, and sequencing the UE-specific information field of each piece of UE in the N pieces of UE according to indication of the index of each piece of UE; and sequencing the UE-specific information field of each piece of UE in the N pieces of UE according to N values obtained by a modulo operation taking N Cell Radio Network Temporary Identifiers (C-RNTI) of the N pieces of UE as dividends and N as divisors, wherein the N values obtained by the modulo operation taking the N C-RNTIs of the N pieces of UE corresponding to the same M-PDCCH as dividends and N as divisors are different from each other.

7. The method as claimed in claim 1, further comprising: configuring one Multi-user RNTI (M-RNTI) to the N pieces of UE through a high-layer signalling, wherein the M-RNTI corresponds to the M-PDCCH.

8. The method as claimed in claim 2, wherein under a condition that the common information field comprises a resource allocation information field, the resource allocation information field is used for indicating one group of resources, wherein the one group of resources comprises N parts of sub-resources, and the N parts of sub-resources are transmitted to the N pieces of UE according to a predefined resource indication rule, wherein one-to-one correspondence exists between the N parts of sub-resources and the N pieces of UE.

9. The method as claimed in claim 8, wherein
the predefined resource indication rule comprises that: each piece of UE in the N pieces of UE corresponds to one index respectively, and one-to-one correspondence exists between indexes of the N pieces of UE and the N parts of sub-resources;
or,
a modulo operation is performed taking N C-RNTIs of the N pieces of UE as dividends and N as divisors, and one-to-one correspondence exists between N values obtained by the modulo operation and the N parts of sub-resources, wherein the N values obtained by the modulo operation taking the N C-RNTIs of the N pieces of UE corresponding to the same M-PDCCH as dividends and N as divisors are different from each other;
or,
the predefined resource indication rule comprises that: each piece of UE in the N pieces of UE corresponds to one index respectively, and one-to-one correspondence exists between indexes of the N pieces of UE and the N parts of sub-resources; and a modulo operation is performed taking N C-RNTIs of the N pieces of UE as dividends and N as divisors, and one-to-one correspondence exists between N values obtained by the modulo operation and the N parts of sub-resources, wherein the N values obtained by the modulo operation taking the N C-RNTIs of the N pieces of UE corresponding to the same M-PDCCH as dividends and N as divisors are different from each other;
or,
the one-to-one correspondence between the N parts of sub-resources and the N pieces of UE in the predefined resource indication rule is changed along with a change in a subframe index;
or,
the one group of resources are continuous resources, or the one group of resources comprise N clusters of resources, wherein resources of each cluster in the N clusters of resources are continuous resources on a frequency band, and different clusters of resources are discontinuous;
or,
the one group of resources are divided into the N parts of sub-resources in at least one of manners as follows: sequential division and extraction at preset intervals;
or,
a resource exchange indicator indicates whether to reorganize the one-to-one correspondence between the N parts of sub-resources and the N pieces of UE or not.

10. The method as claimed in claim 2, wherein under a condition that the common information field comprises a resource allocation information field, the resource allocation information field indicates the same resource to the N pieces of UE, and the N pieces of UE perform data communication with an Evolved Node B (eNodeB) on the same resource by virtue of a multi-user Multiple Input Multiple Output (MIMO) multi-antenna technology.

11. The method as claimed in claim 10, wherein a correspondence between each piece of UE in the N pieces of UE and antenna ports is determined according to at least one piece of the following predefined information: signalling, C-RNTI, subframe index, and predefined value.

12. The method as claimed in claim 1, wherein
a payload of a control information format of the M-PDCCH is the same as a payload of a control information format for single-user grant;
or,
the M-PDCCH comprises at least one of: a single-Transmission Time Interval (TTI) grant M-PDCCH and a multi-TTI grant M-PDCCH;
or,
a scheduling manner for the M-PDCCH is indicated by an RNTI, Cyclic Redundancy Check (CRC), or an RNTI and CRC for scrambling the M-PDCCH, wherein the scheduling manner comprises at least one of: multi-user scheduling and single-user scheduling;
or,
the value of N is notified to the N pieces of UE through a Radio Resource Control (RRC) signalling.

13. A method for acquiring a grant signalling, comprising:
detecting a Multi-Physical Downlink Control Channel (M-PDCCH), wherein the M-PDCCH is used for sending a grant signalling to N pieces of User Equipment (UE), and N is a positive integer more than 1; and
acquiring the grant signalling in the M-PDCCH;
wherein the M-PDCCH is configured by following steps: sequencing the common information field and the UE-specific information field according to a predefined arrangement order of the common information field and the UE-specific information field in the control information format of the M-PDCCH;
wherein the sent grant signalling comprises: a shared grant signalling; wherein the M-PDCCH is used for sending the grant signalling to N pieces of UE further comprises: sending a common grant signalling to the N pieces of UE, sending a UE-specific grant signalling to each of one or more pieces of UE in the N pieces of UE, or sending a common grant signalling to the N pieces of UE and sending a UE-specific grant signalling to each of one or more pieces of UE in the N pieces of UE; wherein one or more of the shared grant signalling, the UE-specific grant signalling and the common grant signalling are sent to the N pieces of UE; wherein sending the shared grant signalling comprises: sending, through the M-PDCCH, the shared grant signalling to the N pieces of UE in a search space shared by the N pieces of UE; sending the common grant signalling comprises: sending the common grant signalling to the N pieces of the UE in a common search space; and sending the UE-specific grant signalling comprises: sending the UE-specific grant signalling in one or more of the common search space, the search space shared by the N pieces of the UE and a UE-specific search space.

14. The method as claimed in claim 13, wherein acquiring the grant signalling in the M-PDCCH comprises:
acquiring the grant signalling according to a control information format of the M-PDCCH, wherein the control information format comprises: the common information field, the UE-specific information field or the common information field and the UE-specific information field, wherein the common information field, the UE-specific information field or the common information field and the UE-specific information field contains the grant signalling.

15. The method as claimed in claim 14, wherein under a condition that the common information field comprises a resource allocation information field, a piece of UE determines, according to a predefined resource indication rule, one part of sub-resources corresponding to the UE itself in one group of resources indicated by the resource allocation information field, wherein the one group of resources comprises N parts of sub-resources, wherein one-to-one correspondence exists between the N parts of sub-resources and the N pieces of UE.

16. The method as claimed in claim 15, wherein
the UE determining, according to the predefined resource indication rule, one part of sub-resources corresponding to the UE itself in the one group of resources indicated by the resource allocation information field comprises: the UE determining one part of sub-resources corresponding to the UE itself according to an index corresponding to the UE; or the UE performing a modulo operation taking its own Cell Radio Network Temporary Identifier (C-RNTI) as a dividend and N as a divisor, and determining one part of sub-resources corresponding to the UE itself according to a correspondence between the value obtained by the modulo operation and its corresponding part of sub-resources;
or,
the one group of resources are continuous resources, or the one group of resources comprise N clusters of resources, wherein resources of each cluster in the N clusters of resources are continuous resources on a frequency band, and different clusters of resources are discontinuous;
or,
the one group of resources are divided into the N parts of sub-resources in at least one of manners as follows: sequential division and extraction at preset intervals.

17. The method as claimed in claim 14, wherein after acquiring the grant signalling in the M-PDCCH, the method further comprises:
communicating with an Evolved Node B (eNodeB) according to a manner indicated by the common information field, the UE-specific information field, or the common information field and the UE-specific information field.

18. The method as claimed in claim 13, wherein detecting the M-PDCCH comprises:
detecting the M-PDCCH according to a Multi-user RNTI (M-RNTI) configured by an eNodeB.

19. The method as claimed in claim 13, wherein the acquired grant signalling comprises: a shared grant signalling.

20. The method as claimed in claim 19, further comprising: acquiring a common grant signalling, a UE-specific grant signalling, or a common grant signalling and a UE-specific grant signalling.

21. The method as claimed in claim 20, wherein
acquiring the shared grant signalling comprises: detecting the M-PDCCH in a search space shared by the N pieces of UE to acquire the shared grant signalling;
acquiring the common grant signalling comprises: acquiring the common grant signalling in a common search space; and
acquiring the UE-specific grant signalling in one of manners as follows: acquiring the UE-specific grant signalling in the common search space, or acquiring the UE-specific grant signalling in the common search space and a UE-specific search space, or acquiring the UE-specific grant signalling in the common search space, the search space shared by the N pieces of UE and the UE-specific search space.

22. The method as claimed in claim 13, wherein the M-PDCCH is transmitted on a Physical Downlink Control Channel (PDCCH), an Enhanced Physical Downlink Control Channel (EPDCCH), or a PDCCH and an EPDCCH and each M-PDCCH corresponds to one control information format.

23. A device for sending a grant signalling, comprising:
a configuration unit, configured to configure one Multi-Physical Downlink Control Channel (M-PDCCH); and
a sending unit, configured to send a grant signalling to N pieces of User Equipment (UE) through the M-PDCCH;
wherein the configuration unit includes: a sequencing module, configured to sequence the common information field and the UE-specific information field according to a predefined arrangement order of the common information field and the UE-specific information field in the control information format of the M-PDCCH;
wherein the sent grant signalling comprises: a shared grant signalling; wherein the method further comprises: sending a common grant signalling to the N pieces of UE, sending a UE-specific grant signalling to each of one or more pieces of UE in the N pieces of UE, or sending a common grant signalling to the N pieces of UE and sending a UE-specific grant signalling to each of one or more pieces of UE in the N pieces of UE; wherein one or more of the shared grant signalling, the UE-specific grant signalling and the common grant signalling are sent to the N pieces of UE; wherein sending the shared grant signalling comprises: sending, through the M-PDCCH, the shared grant signalling to the N pieces of UE in a search space shared by the N pieces of UE; sending the common grant signalling comprises: sending the common grant signalling to the N pieces of the UE in a common search space; and sending the UE-specific grant signalling comprises: sending the UE-specific grant signalling in one or more of the common search space, the search space shared by the N pieces of the UE and a UE-specific search space.

24. A device for acquiring a grant signalling, comprising:
a detection unit, configured to detect a Multi-Physical Downlink Control Channel (M-PDCCH), wherein the M-PDCCH is used for sending a grant signalling to N pieces of User Equipment (UE), and N is a positive integer more than 1; and
a first acquisition unit, configured to acquire the grant signalling in the M-PDCCH;

wherein the M-PDCCH is configured by following steps:
sequencing the common information field and the UE-specific information field according to a predefined arrangement order of the common information field and the UE-specific information field in the control information format of the M-PDCCH;

wherein the sent grant signalling comprises: a shared grant signalling; wherein the M-PDCCH is used for sending the grant signalling to N pieces of UE further comprises: sending a common grant signalling to the N pieces of UE, sending a UE-specific grant signalling to each of one or more pieces of UE in the N pieces of UE, or sending a common grant signalling to the N pieces of UE and sending a UE-specific grant signalling to each of one or more pieces of UE in the N pieces of UE; wherein one or more of the shared grant signalling, the UE-specific grant signalling and the common grant signalling are sent to the N pieces of UE; wherein sending the shared grant signalling comprises: sending, through the M-PDCCH, the shared grant signalling to the N pieces of UE in a search space shared by the N pieces of UE; sending the common grant signalling comprises: sending the common grant signalling to the N pieces of the UE in a common search space; and sending the UE-specific grant signalling comprises: sending the UE-specific grant signalling in one or more of the common search space, the search space shared by the N pieces of the UE and a UE-specific search space.

* * * * *